Sept. 22, 1964     D. I. WEINBERG     3,149,492
FLUID PRESSURE GAUGE

Filed March 6, 1961     2 Sheets-Sheet 1

INVENTOR.
DANIEL I. WEINBERG
BY
B. B. Olive
ATTORNEY

INVENTOR.
DANIEL I. WEINBERG
BY
B. B. Olive
ATTORNEY

United States Patent Office 3,149,492
Patented Sept. 22, 1964

3,149,492
FLUID PRESSURE GAUGE
Daniel I. Weinberg, Durham, N.C., assignor to Astra, Inc., Raleigh, N.C., a corporation of North Carolina
Filed Mar. 6, 1961, Ser. No. 93,667
5 Claims. (Cl. 73—393)

This invention is concerned generally with apparatus and a method for measuring the pressure of liquid flowing in a flexible, thin wall tube. The invention has been found useful in measuring blood pressure during experimental animal surgery and is explained in reference to such an application.

It has been the practice during experimental surgery on animals to measure blood pressure in the aorta and other blood vessels by inserting a catheter tube through the wall of the blood carrying vessel and allowing the pressure to act on appropriate pressure measuring means located either at the distal or inner end of the catheter. The catheter method inherently requires that the wall of the blood carrying vessel be penetrated which is a disadvantage during any form of surgery both because of the time required as well as the introduction of a potential point of infection. There is a further disadvantage in that in addition to the catheter tube, other pressure sensing apparatus associated with the catheter tube is required to be in the immediate operating area.

The apparatus and method of my invention avoids the problem of having to penetrate the aorta or other blood vessel in that I employ its thin wall expansible tube characteristic and in place of the catheter, I use a special C-shaped, relatively small, slotted ring measuring device that can be slipped over the blood vessel so as to surround and come in relatively tight contact with the outer surface. No penetration or other physical damage to the blood carrying vessel is necessary and only the ring itself and some associated fine wire leads are required in the surgical area where measurements are being taken. The expansion of the tube during each pressure pulse expands the slotted ring and this expansion or strain is electrically detected and converted to an electrical reading. Since the amount of strain experienced by the ring is directly related to the pressure asserted on the ring, the detected signal may be converted by suitable instruments to a reading representing pressure in the vessel.

An object of the present invention, therefore, is to provide an apparatus and method for measuring pressure in a flexible thin wall tube which do not require penetration of the wall of the tube in order to effect the measurement.

Another object is to provide an apparatus and method for measuring pressure in a flexible thin wall tube which are particularly adapted for rapid use during surgery.

Another object is to provide an apparatus and method for measuring blood pressure during surgery which require a minimum number of components in the area of operation.

Other objects will become apparent as the description proceeds and in the drawings in which.

Figure 1:
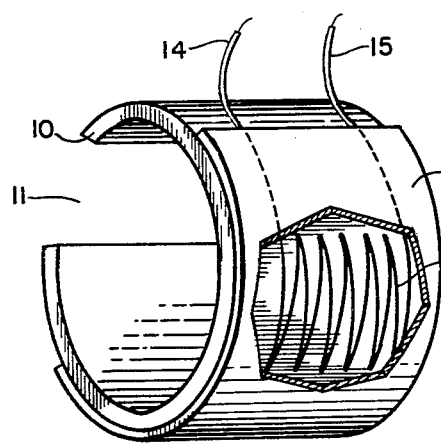
FIGURE 1 is a perspective view of one form of the slotted ring gauge used in the invention.
Figure 3:
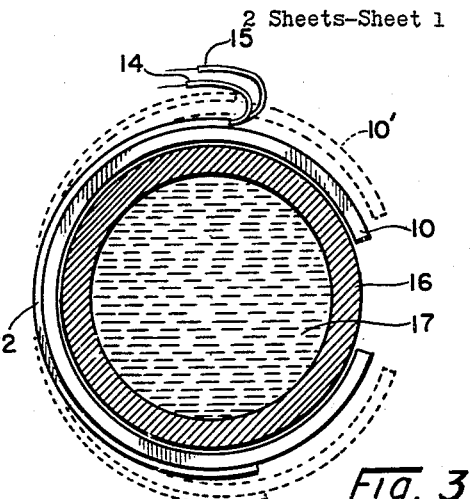
FIGURE 3 is a schematic cross section showing how the pressure acts to stress the ring gauge.
Figure 2:
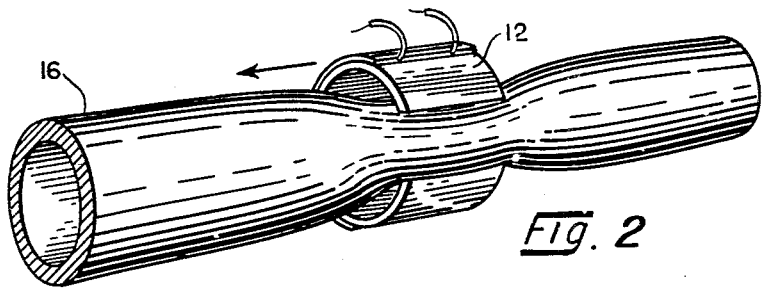
FIGURE 2 is a perspective view showing the slotted ring gauge of FIGURE 1 being slipped over an aorta.

As previously mentioned, the pressure detecting element of the invention is in a form which does not require any physical penetration of the wall of the tube in which the pressure is being measured. FIGURES 1 through 3 illustrate one of the simplest forms of the pressure detecting element to which drawings reference is now made.

10 represents a relatively rigid but elastic, C-shaped, slotted ring having a relatively narrow laterally disposed opening 11 suitable for passing over blood vessels and the like. Bonded to the outer surface of ring 10 is an electrical strain detecting gauge 12 having a strain sensitive resistance element 13 which is adaptable to measure any stress placed on ring 10 and which, through leads 14, 15 may be connected into an appropriate electrical circuit as later explained.

The drawing shown is greatly enlarged. As an example, the gauge illustrated in FIGURE 1 was made in one form suitable for measuring the blood pressure in the aorta of an experimental medium size dog. In this case, the outside diameter of ring 10 was made 0.500 inch, the thickness was made 0.035 inch, the slot 11 was made 0.156 inch, the width was made 0.375 inch and the material selected was class 321 stainless steel. In this same example, a type SR4A7 resistance strain gauge as manufactured by the Baldwin Lima Hamilton Company of Waltham, Massachusetts was employed for the purposes of strain gauge 12. This particular strain gauge has a resistance of approximately 120 ohms and a gauge factor of approximately 1.98. It will be appreciated that the gauge will take such dimensions and will employ a strain gauge of appropriate characteristic as a particular pressure problem may demand.

Referring next to FIGURE 2, the slotted ring 10 is shown in perspective and somewhat schematically, as it appears when being placed in position over a section of a dog's aorta indicated at 16. The dog's aorta 16 is a thin wall, flexible tube and it generally tapers in the vicinity of the heart. Ring 10 is applied by compressing a section of the aorta and passing this section through the slot 11 after which the ring is moved along the aorta in the direction of the arrow until it is in relatively tight fit.

Once positioned as described, the wall of aorta 16 will with each pulse of pressure expand against ring 10. This action is represented in schematic cross section in FIGURE 3 where 17 represents the blood and the dotted lines 10' indicate how ring 10 expands and is consequently stressed as a result of the pressure of blood 17 acting on the wall or aorta 16. It should be noted that dotted lines 10' are greatly exaggerated to emphasize the principle of operation as the actual expansion is very small in amount and is not perceptible to the naked eye. With each such periodic expansion the strain detecting means 12 illustrated as a resistance gauge will experience a change in resistance proportional to the pressure asserted and this change may be utilized with appropriate circuitry to indicate pressure and to which circuitry reference is next made.

Figure 4:
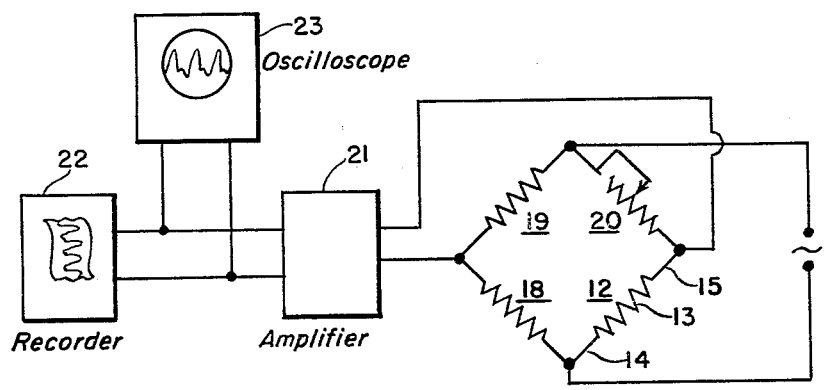
FIGURE 4 is a schematic wiring diagram of one circuit that may be employed with the ring gauge of FIGURE 1.

Once positioned as depicted in FIGURES 2 and 3, the leads 14, 15 from strain gauge 12 may be introduced into a suitable bridge network as illustrated in FIGURE 4. In this figure, it will be noted that strain gauge 12 forms one leg of a wheatstone bridge network in which the other legs represented as 18, 19, and 20 respectively are filled by standard resistances, one or more of which may be adjustable to facilitate balancing. Once so connected and balanced, it can be seen that any pressure pulses in aorta 16 will show themselves as a strain on ring 10 which strain will be detected by strain gauge 12 and converted into a signal that may be amplified as indicated by amplifier 21 and either recorded as at recorder 22 or visually observed as at oscilloscope 23.

Figure 5:
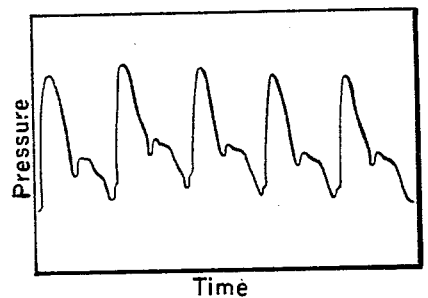
FIGURE 5 shows the shape of a curve trace made by use of the invention.

It is important to note that the ring 10 is employed in a tight fit relation with the blood vessel in order to reveal both diastolic and systolic levels of pressure and to avoid detecting only the peaks of the pressure pulses. FIGURE 5 illustrates the curve trace shape that may be obtained with the example previously referred to and with a deflection in the amount of about 0.0006 inch. In FIGURE 5 it will be noticed that there is a relatively wide swing indicating that the ring 10 has been properly positioned. With this arrangement, the gauge is essentially a pressure rather than a displacement transducer which avoids the problem of having to compute the elasticity of the blood vessel since there is essentially no motion of the vessel within the ring. This small displacement feature also makes the system far more linear than would be the case were the displacement of a large amount.

Prior to installing ring 10 the system may be calibrated by placing ring 10 over a section of aorta removed from an animal having essentially the same characteristic as the experimental subject or ring 10 may be placed over a section of very thin rubber tubing of similar characteristic. In either case, the chosen section is then placed in the tube system of a conventional sphygmomanometer. By pumping up the sphygmomanometer and comparing the sphygmomanometer mercury reading with the electrical reading a calibration curve can be obtained.

Figure 6:
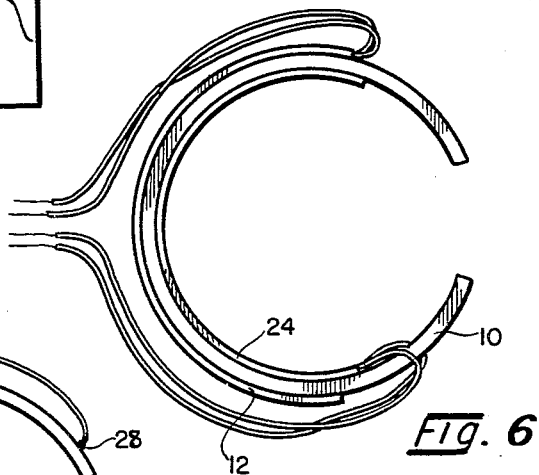
FIGURE 6 is an elevation view similar to FIGURE 1 but showing use of two electrical detecting means on the slotted ring gauge.
Figure 7:
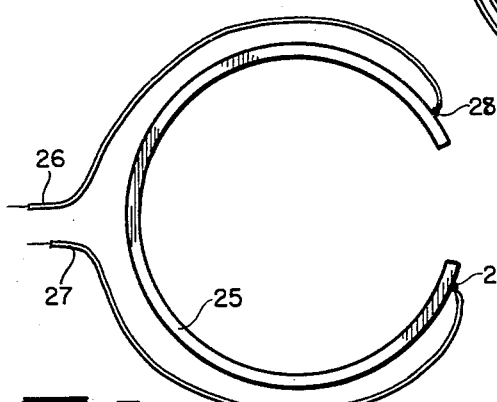
FIGURE 7 is an elevation view showing the slotted ring gauge made of a stress sensing material.
Figure 8:
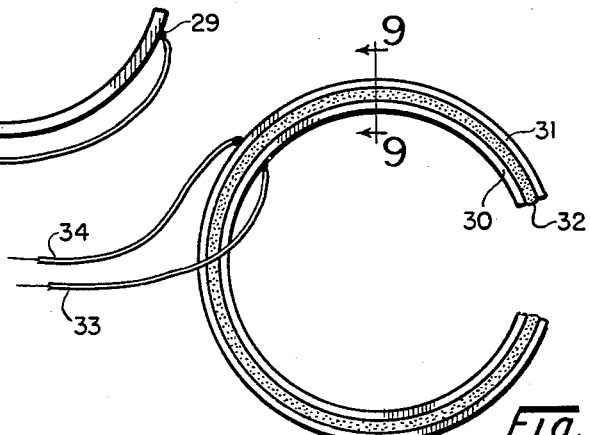
FIGURE 8 is an elevation view showing use of a dielectric material in the slotted ring gauge.

It will be apparent to those skilled in the art that my novel slotted ring structure may be constructed and employed in other ways. For example, there are other ways in which strain can be detected in a slotted ring structure placed under stress as previously described. FIGURES 6, 7 and 8 deal somewhat schematically with some of these alternative forms. As indicated in FIGURE 6, in addition to the previously mentioned strain gauge 12, ring 10 may include an additional strain gauge 24 bonded to ring 10 opposite to the position of strain gauge 12. With this arrangement the strain gauges may form two legs of a bridge network as previously described for purposes of greater sensitivity.

In FIGURE 7, the slotted ring is schematically represented as being of a solid piezo-electric structure 25 having output leads 26, 27 bonded to structure 25 at 28, 29 respectively. In this example the electric characteristic change is in the form of a voltage change which may be detected by suitable instruments and converted to an appropriate electrical indication in a manner well known in the art.

Figure 9:
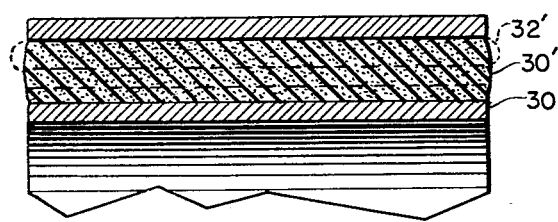
FIGURE 9 is a cross section taken along line 9—9 of FIGURE 8.

In FIGURES 8 and 9, the slotted ring is schematically shown as comprising a relatively flexible inner ring 30 and a relatively rigid outer ring 31 separated by a suitable elastic dielectric material such as silicon sponge indicated at 32. Leads 33, 34 are taken off from the respective rings 30, 31. In this example, pressure in the blood vessel acts on the inner ring 30 so as to expand ring 30 to the dotted line position 30' and compress the dielectric 32 as indicated by the exaggerated dotted line position 32'. In this dotted line position the capacitance will have changed proportionate to the pressure asserted and this may be detected through suitable capacitance sensitive instruments, not shown, connected to leads 33, 34 and converted to an appropriate electrical reading by any of several means well known in the art.

Having described my invention what I claim is:

1. A device for measuring fluid pressure in a flexible thin wall tube comprising a relatively inflexible laterally slotted ring member, said member being adapted to pass over, substantially enclose, and tightly contact a length of said tube whereby to allow said pressure to expand said wall and stress and slightly deflect said member in accordance with the amount of said pressure, stress detecting means bonded to said member so as to be subjected to said stress and of the type having an electrical characteristic that varies with said stress and electrical indicating means dependent on said characteristic.

2. A device for measuring fluid pressure in a flexible thin wall tube comprising a relatively inflexible laterally slotted ring member, said member being adapted to pass over, enclose and tightly contact a major portion of the outer peripheral surface area of a length of said tube whereby to allow said pressure to expand said wall against said member and to stress and slightly deflect said member in accordance with the amount of said pressure, detecting means bonded to said member so as to be subjected to said stress and composed of a material whose electrical resistance varies with the stress imposed thereon and electrical indicating means dependent on said resistance.

3. A device for measuring fluid pressure in a flexible thin wall tube comprising a relatively inflexible laterally slotted ring member, said member being adapted to pass over, enclose and tightly contact a portion of the outer surface area of a length of said tube, said pressure thereby being allowed to stress and slightly deflect said member in accordance with the amount of said pressure, said member being composed at least partially of a material having an electrical characteristic that varies with said stress and electrical indicating means dependent on said charateristic.

4. A device for measuring fluid pressure in a flexible thin wall tube comprising a relatively inflexible laterally slotted ring member, said member being adapted to pass over, enclose and tightly contact a portion of the outer surface area of a length of said tube, said pressure thereby being allowed to stress and slightly deflect said member in accordance with the amount of said pressure, said member being composed of a material having an electrical voltage characteristic that varies with said stress and electrical indicating means dependent on said characteristic.

5. A device for measuring pressure in a flexible thin wall tube comprising an outer relatively inflexible laterally slotted ring member, a matching inner relatively flexible laterally slotted ring member, dielectric means disposed between said members whereby to space said members apart and establish a given electrical capacitance therebetween, said capacitance being subject to change upon compression of said dielectric means, said members and dielectric means forming a composite slotted ring member, said composite member being adapted to enclose and tightly contact a portion of the outer surface of a length of said tube, said pressure thereby being allowed to deflect said inner member and compress said dielectric means in accordance with the amount of said pressure and electrical indicating means dependent on said capacitance.

References Cited in the file of this patent
UNITED STATES PATENTS

| | | |
|---|---|---|
| 2,419,061 | Emery | Apr. 15, 1947 |
| 2,452,799 | Speaker et al. | Nov. 2, 1948 |
| 2,634,721 | Greenwood | Apr. 14, 1953 |
| 2,851,030 | Boucke | Sept. 9, 1958 |